US011361049B2

(12) United States Patent
Sasaki et al.

(10) Patent No.: US 11,361,049 B2
(45) Date of Patent: *Jun. 14, 2022

(54) HISTORY MANAGEMENT METHOD

(71) Applicant: J-DATA CO., LTD., Kyoto (JP)

(72) Inventors: Koji Sasaki, Kyoto (JP); Tetsuya Ban, Kyoto (JP)

(73) Assignee: J-DATA CO., LTD., Kyoto (JP)

( * ) Notice: Subject to any disclaimer, the term of this patent is extended or adjusted under 35 U.S.C. 154(b) by 72 days.

This patent is subject to a terminal disclaimer.

(21) Appl. No.: 16/860,518

(22) Filed: Apr. 28, 2020

(65) Prior Publication Data
US 2020/0257744 A1    Aug. 13, 2020

Related U.S. Application Data

(63) Continuation of application No. 15/745,482, filed as application No. PCT/JP2015/074150 on Aug. 27, 2015, now Pat. No. 10,678,883.

(51) Int. Cl.
*G06F 7/00* (2006.01)
*G06F 16/00* (2019.01)
(Continued)

(52) U.S. Cl.
CPC ....... *G06F 16/958* (2019.01); *G06Q 30/0214* (2013.01); *G06Q 30/0236* (2013.01);
(Continued)

(58) Field of Classification Search
None
See application file for complete search history.

(56) References Cited

U.S. PATENT DOCUMENTS

| 2002/0032738 A1 | 3/2002 | Foulger et al. |
| 2007/0022170 A1 | 1/2007 | Foulger et al. |
| (Continued) |

FOREIGN PATENT DOCUMENTS

| JP | 2003-16336 A | 1/2003 |
| JP | 2005-242530 A | 9/2005 |
| (Continued) |

OTHER PUBLICATIONS

International Search Report dated Nov. 10, 2015, in PCT/JP2015/074150 filed Aug. 27, 2015.
(Continued)

*Primary Examiner* — Tuan A Pham
(74) *Attorney, Agent, or Firm* — Oblon, McClelland, Maier & Neustadt, L.L.P.

(57) ABSTRACT

When a first member transmits information on a network, a converted first hash code which includes a member ID of the first member is given. When a second member further transmits and diffuses the information transmitted from the first member, the converted previous first hash code which includes the member ID of the first member is associated with a converted second hash code which includes a member ID of the second member. When the still other member accesses the information transmitted by the second member, the second member is specified from the second hash code and the first member is specified from the first hash code associated with the second hash code.

3 Claims, 6 Drawing Sheets

(51) Int. Cl.
*G06F 16/958* (2019.01)
*G06Q 30/02* (2012.01)
*G06Q 50/00* (2012.01)
*H04L 67/10* (2022.01)

(52) U.S. Cl.
CPC ......... *G06Q 30/0277* (2013.01); *G06Q 50/01* (2013.01); *H04L 67/10* (2013.01); *G06Q 2220/00* (2013.01)

(56) References Cited

U.S. PATENT DOCUMENTS

| | | | | |
|---|---|---|---|---|
| 2007/0214043 | A1* | 9/2007 | Yasuda | G06Q 30/0207 705/14.1 |
| 2007/0274489 | A1 | 11/2007 | Yamamura | |
| 2008/0244027 | A1 | 10/2008 | Foulger et al. | |
| 2010/0121735 | A1 | 5/2010 | Shimooka | |
| 2014/0258351 | A1 | 9/2014 | Laron | |
| 2014/0278864 | A1 | 9/2014 | Stanislaw et al. | |
| 2014/0344038 | A1* | 11/2014 | Sato | G06Q 30/0258 705/14.16 |

FOREIGN PATENT DOCUMENTS

| | | |
|---|---|---|
| JP | 2009-116629 A | 5/2009 |
| JP | 2011-83597 A | 4/2011 |
| JP | 2013-171418 A | 9/2013 |
| JP | 2014-75072 A | 4/2014 |
| JP | 2014-146379 A | 8/2014 |
| JP | 2014-186471 A | 10/2014 |
| JP | 2015-7947 A | 1/2015 |
| KR | 10-2006-9088194 A | 8/2006 |
| KR | 10-0741004 B1 | 7/2007 |
| KR | 10-0917996 B1 | 9/2009 |
| KR | 10-1538278 B1 | 7/2015 |
| WO | WO 01/82112 A2 | 11/2001 |
| WO | WO 01/82112 A3 | 11/2001 |
| WO | WO 2009/008091 A1 | 1/2009 |
| WO | WO 2013/111827 A1 | 8/2013 |

OTHER PUBLICATIONS

Office Action dated Mar. 11, 2020 in European Application No. 15 902 293.8.
Office Action dated Dec. 19, 2019 in corresponding Korean Patent Application No. 10-2018-7000162 (with English Translation), 11 pages.
Extended European Search Report dated Feb. 25, 2019 in European Patent Application No. 15902293.8., 9 pages.
Office Action dated Mar. 6, 2019 in the corresponding Malaysian Application No. PI 2018700060.
Indian Office Action dated Dec. 24, 2020 in Indian Patent Application No. 201717047130 (with English translation), 7 pages.
Combined Chinese Office Action and Search Report dated Apr. 7, 2021 in Chinese Patent Application No. 201580081915.2 (with unedited computer generated English translation), 16 pages.
Notification of Reason for Refusal dated Apr. 6, 2021 in Korean Patent Application No. 10-2020-7035155 (with English language translation), 13 pages.
Office Action dated Nov. 6, 2020 in corresponding Korean Patent Application No. 10-2018-7000162 (with English Translation), 6 pages.
Office Action dated Feb. 28, 2022 in Korean Patent Application No. 10-2020-7035155, along with an English translation.

* cited by examiner

| MEMBER ID | NAME OF MEMBER | ADDRESS | STATE | POINT |
|---|---|---|---|---|
| P0001 | A | KYOTO | active | 300 |
| P0002 | B | OSAKA | active | 210 |
| P0003 | C | NARA | active | 160 |
| P0004 | D | HYOGO | WITHDRAWN | 3 |

FIG. 5

| ADVERTISEMENT ID | ADVERTISEMENT INFORMATION | POINT | DISTRIBUTION PERIOD |
|---|---|---|---|
| A0001 | Ad A | 1 | 2015/1/1-2015/3/31 |
| A0006 | Ad A | 1 | 2015/4/1-2015/5/31 |
| Z0832 | Ad B | 10 | 2015/3/1-2015/3/31 |
| N2210 | Ad C | 3 | 2015/2/1-2015/3/31 |
| J2301 | Ad J | 1 | 2015/6/26-2015/7/24 |

| ACCESS MEMBER ID | TRANSMISSION MEMBER ID | ADVERTISEMENT ID | ACCESS DATE AND TIME |
|---|---|---|---|
| P0002 | P0001 | A0001 | 2015/7/1 18:33:41 |
| P0133 | P0001 | A0001 | 2015/7/1 19:01:10 |
| P0003 | P0002 | A0001 | 2015/7/2 20:32:15 |
| P0054 | P4032 | N2210 | 2015/7/5 15:04:32 |

FIG. 8

| TRANSMISSION MEMBER ID | ADVERTISEMENT ID | GENERATED HASH CODE | ORIGINAL HASH CODE |
|---|---|---|---|
| P0001 | A0001 | a5X0an7b | ... |
| P0001 | Z0832 | dgk6ZP5r | ... |
| P0002 | A0001 | zb8Th6ds | a5X0an7b |
| P4032 | N2210 | mwk74FEg | U4Cd8jwq |
| P0003 | A0001 | S3dr8y0p | zb8Th6ds |

HISTORY MANAGEMENT METHOD

CROSS-REFERENCE TO RELATED APPLICATIONS

This application is a continuation of U.S. application Ser. No. 15/745,482, filed Jan. 17, 2018, which is a national stage of International Application No. PCT/JP2015/074150, filed Aug. 27, 2015. The above-identified applications are incorporated herein by reference in their entireties.

TECHNICAL FIELD

The present invention relates to a history management method of managing a history of diffusing information of advertisement, for example, on a network such as Internet.

BACKGROUND ART

Recently, with a spread of Internet, a purchase of goods on Internet has been recognized as a general transaction form, and an advertising on Internet has been established. The advertising on Internet includes an advertising system referred to as an affiliate advertising as disclosed in Patent Document 1, for example. The affiliate advertising indicates an advertising system that an opener of a homepage or a blog posts a banner advertisement of a merchandise or a service which the opener intends to introduce at his/her webpage, and when a reader clicks the banner advertisement and visits a selling site of an advertiser, thereby buying goods, for example, a result reward is paid by the advertiser to the site opener posting the banner advertisement.

PRIOR ART DOCUMENTS

Patent Documents

Patent Document 1: Japanese Patent Application Laid-Open No. 2009-116629

SUMMARY

Problem to be Solved by the Invention

In the meanwhile, today when Internet is widely spread and mobile phones including a smartphone deeply penetrate, a service, referred to as a social networking service (SNS), of connecting individuals via Internet has also been spread. Since information is basically transmitted to related acquaintances in SNS, when advertisement information is transmitted via SNS, goods, for example, are introduced between the acquaintances by so-called word of mouth, and furthermore, a transmission speed is much faster than a traditional word-of-mouth communication, thus the word-of-mouth communication via SNS can be a significantly fascinating method from a standpoint of the advertiser.

However, there has been conventionally no system of using the word-of-mouth communication via the network such as SNS for publicity and advertising. In order to use SNS, for example, for publicity and advertising, it is preferable to not only pay the reward to the person who has posted the banner advertisement such as the affiliate advertising but also establishing a system which enables a plurality of persons, which have mediated the transmission of the advertisement information, to receive some reward. A technique of managing a history of diffusing advertisement information, for example, on the network such as Internet is necessary to achieve the system.

The present invention therefore has been made to solve problems as described above, and it is an object of the present invention to provide a history management method which enables a tracing and grasp of a history of transmitting information on a network.

Means to Solve the Problem

In order to solve the above problems, according to a first aspect of the present invention, a history management method of managing a history of diffusing information on a network includes: a first hash code generation step of making a hash code generation server generate a first hash code from an identification code of a first member and an identification code of predetermined information when the first member transmits the predetermined information via a network, and give the first hash code to an address of the predetermined information on the network to describe the address and the first hash code in the predetermined information; a first access management step of making an access management server, when a second member accesses the predetermined information in response to the transmission from the first member, specify the identification code of the first member and the identification code of the predetermined information from the first hash code; a second hash code generation step of making the hash code generation server generate a second hash code from an identification code of the second member and the identification code of the predetermined information when the second member further transmits the predetermined information received from the first member via the network, give the second hash code to the address of the predetermined information on the network to describe the address and the second hash code in the predetermined information, and associate the first hash code with the second hash code to register the first hash code and the second hash code in a hash code history database; and a second access management step of making the access management server, when a third member accesses the predetermined information in response to the transmission from the second member, specify the identification code of the second member and the identification code of the predetermined information from the second hash code, obtain the first hash code associated with the second hash code from the hash code history database, and specify the identification code of the first member from the first hash code.

According to a second aspect, in the history management method according to the first embodiment, in the first access management step, a point is given to the second member who has accessed the predetermined information and the first member specified from the first hash code, and in the second access management step, a point is given to the third member who has accessed the predetermined information, the second member specified from the second hash code, and the first member specified from the first hash code.

According to a third aspect, in the history management method according to the first embodiment, when the third member accesses the predetermined information, accompanying information transmitted by the first member and the second member in accompanying information transmitted in association with the predetermined information is displayed in priority to another accompanying information.

Effects of the Invention

According to the history management method according to the first to third embodiments, the first hash code is associated with the second hash code, thus when the third member accesses the predetermined information, the first member and the second member who are information transmission paths can be specified, and the history of transmitting the information on the network can be traced and grasped.

DESCRIPTION OF EMBODIMENT(S)

Embodiments of the present invention are described in detail hereinafter with reference to drawings.

Figure 1:
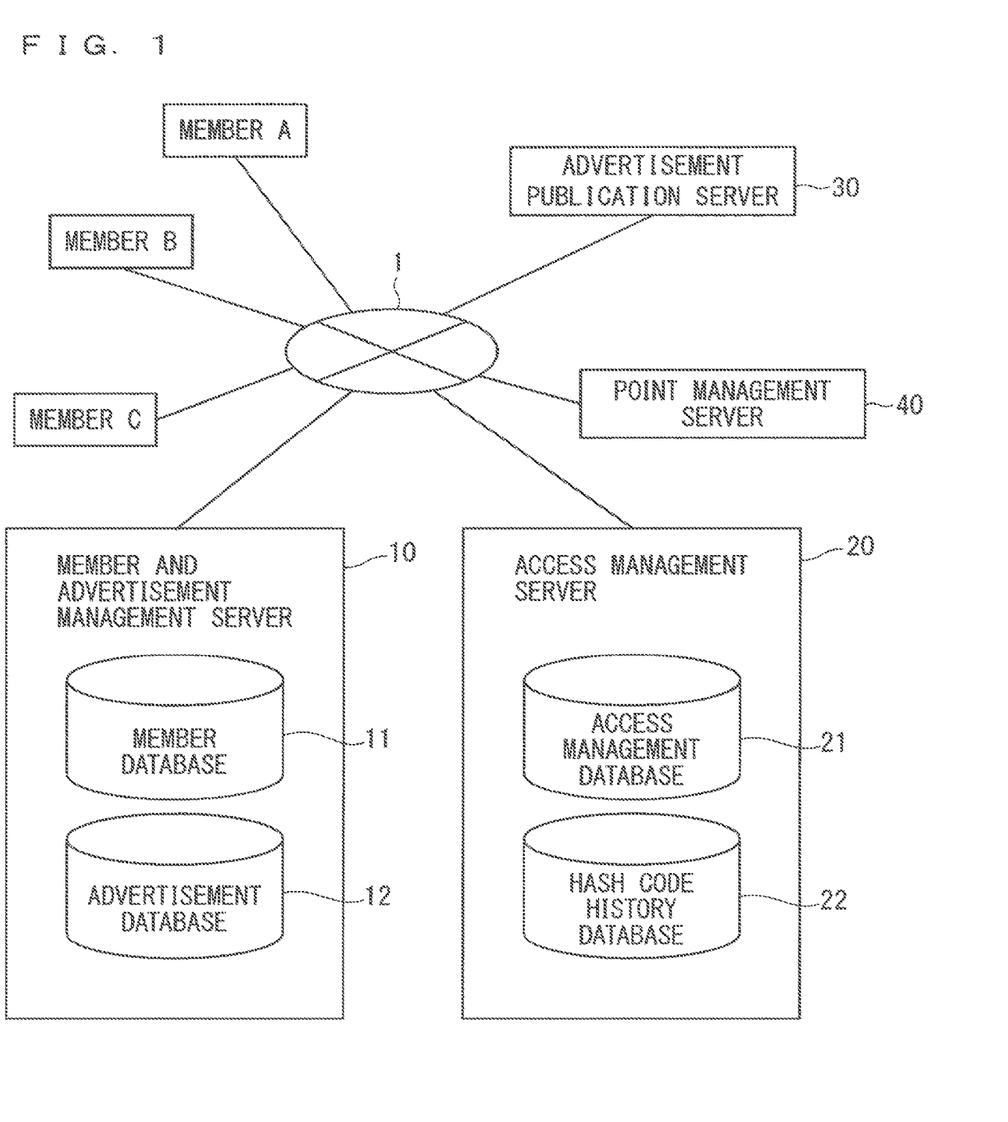
[FIG. 1] A drawing illustrating an example of a system establishment for executing a history management method according to the present invention.

FIG. 1 is a drawing illustrating an example of a system establishment for executing a history management method according to the present invention. This system indicates a system of paying a reward in a form of a point to a person which has transmitted the advertisement information by SNS or e-mail, for example, via a network.

Members A, B, and C are members registered in this system. Each of the members A, B, and C has an information terminal such as a personal computer, a tablet, a smartphone which can be connected to an internet 1.

Each of a member and advertisement management server 10, an access management server 20, an advertisement publication server 30, and a point management server 40 connected to the interact 1 includes a typical computer system. That is to say, each server includes a CPU which is a circuit to perform various types of arithmetic processing, a ROM which is a read-only memory to store a basic program, a RAM which is a readable/writable memory to store various types of information, and a magnetic disk which stores control software or data. The member and advertisement management server 10 stores a member information management database 11 and an advertisement management database 12 in the magnetic disk. The access management server 20 stores an access management database 21 and a hash code history database 22 in the magnetic disk. The CPU of each server executes a predetermined processing program, and each server thereby performs processing specific to each server. Specific contents of the processing performed by each server are further described hereinafter.

Figure 2:
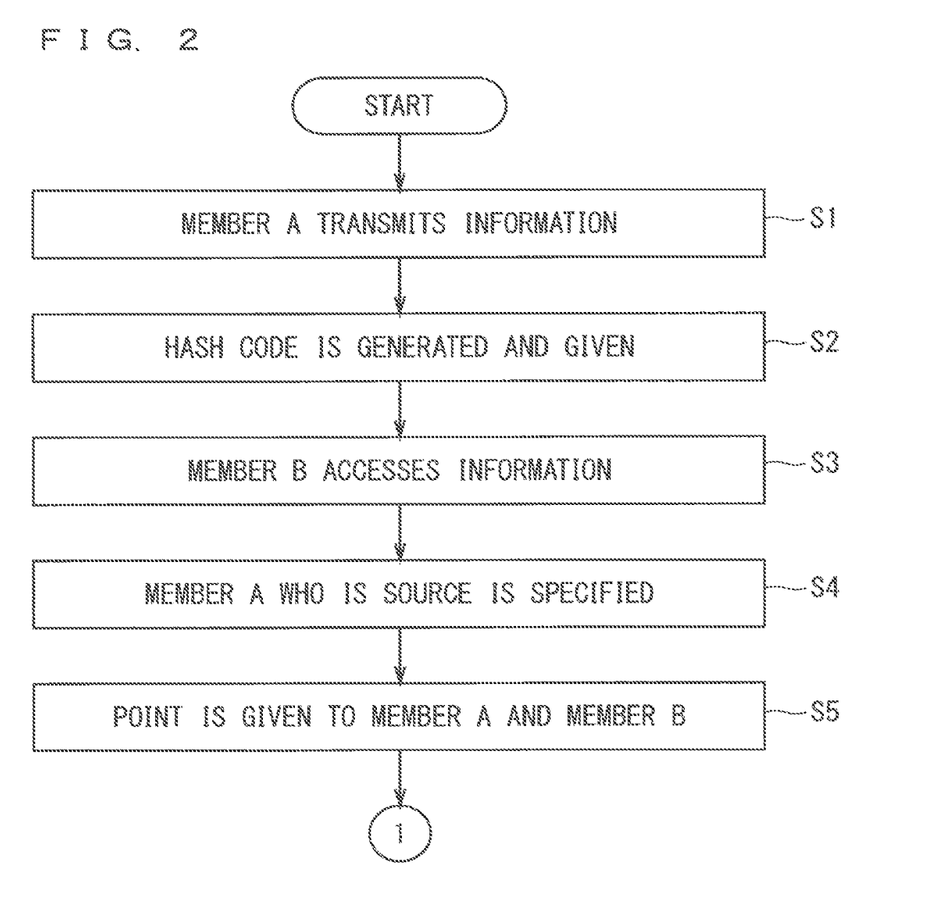
[FIG. 2] A flow chart illustrating a procedure of managing a transmission history of advertisement information and giving a point in a system in FIG. 1.
Figure 3:
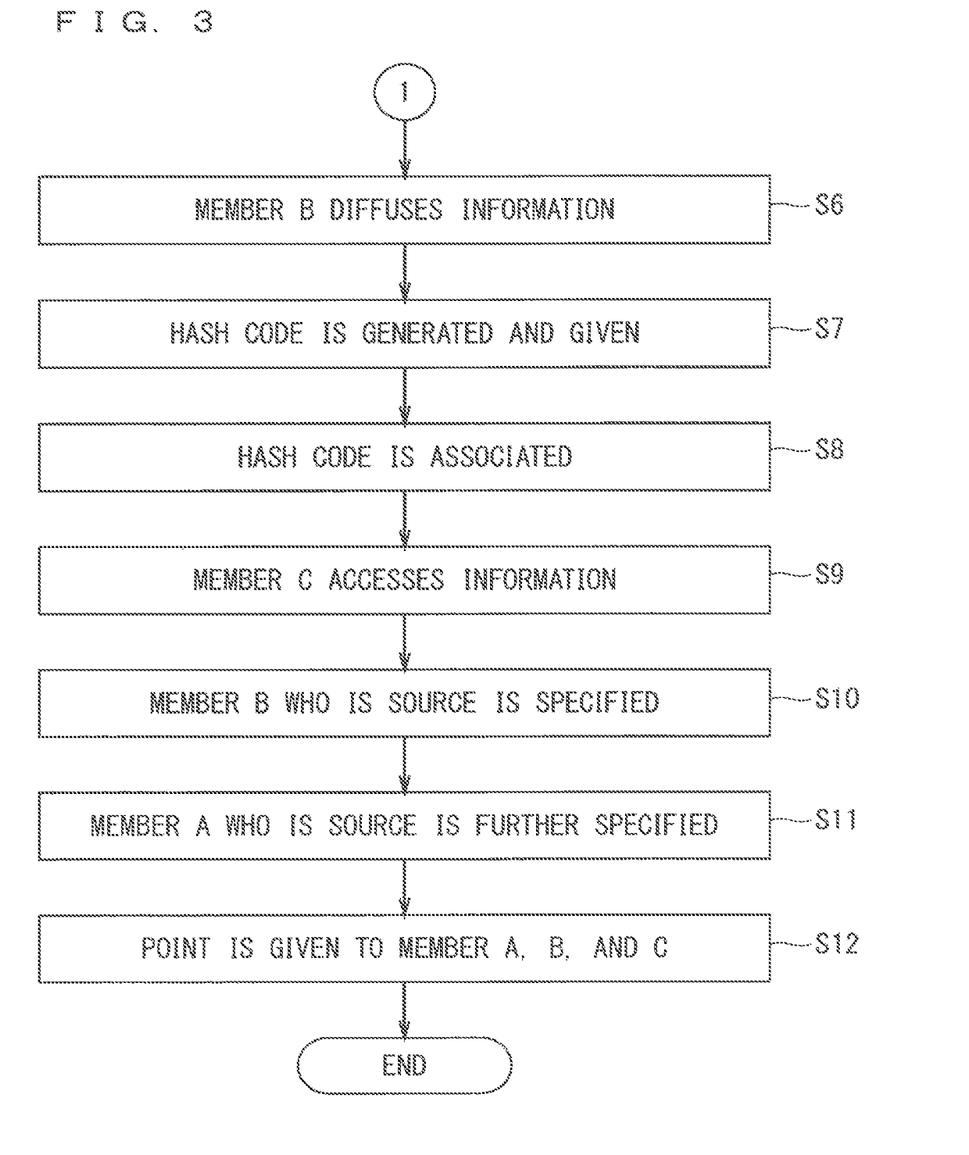
[FIG. 3] A flow chart illustrating a procedure of managing a transmission history of advertisement information and giving a point in the system in FIG. 1.

FIG. 2 and FIG. 3 are flow charts each illustrating a procedure of managing a transmission history of advertising information and giving a point in the system in FIG. 1. Prior to the processing procedure, a plurality of members have been registered in the system described above. The member registration is performed by inputting a necessary item in accordance with a predetermined entry form from an entry guidance site of the member and advertisement management server 10, for example. The registered member information is registered in the member information management database 11 held by the member and advertisement management server 10.

Figure 4:
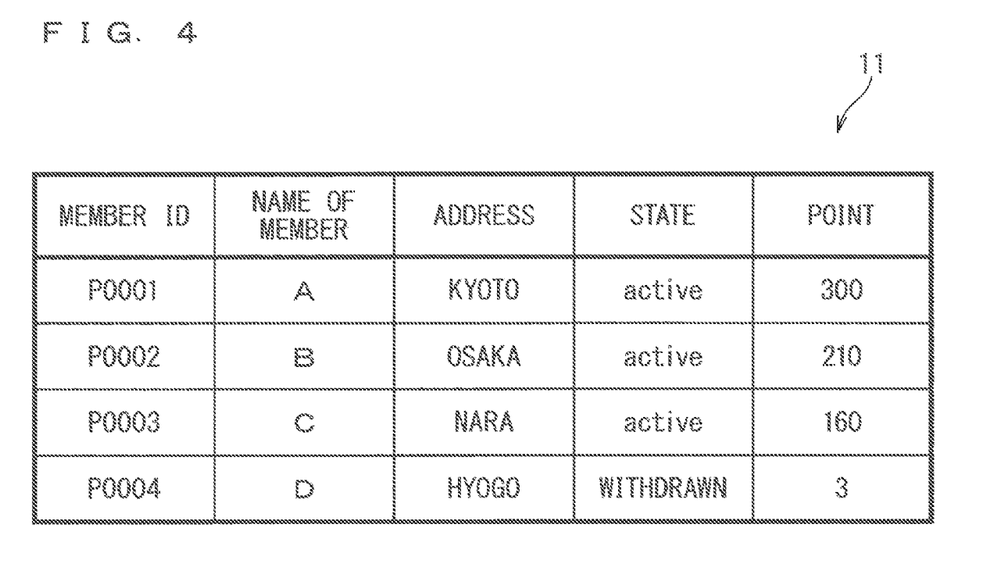
[FIG. 4] A drawing illustrating an example of a member information management database.

FIG. 4 is a drawing illustrating an example of the member information management database 11. In this example, four members of A, B, C, and D are registered in the member information management database 11. A member ID is individually allocated to each member, and is registered in the member information management database 11. That is to say, the member ID is an identification code uniquely allocated to each registered member. For example, a member ID "P0001" is allocated to the member A, and a member ID "P0002" is allocated to the member B. An address, a state (whether the member is active or has withdrawn), and an acquired point, for example, are registered in the member information management database 11.

Figure 5:
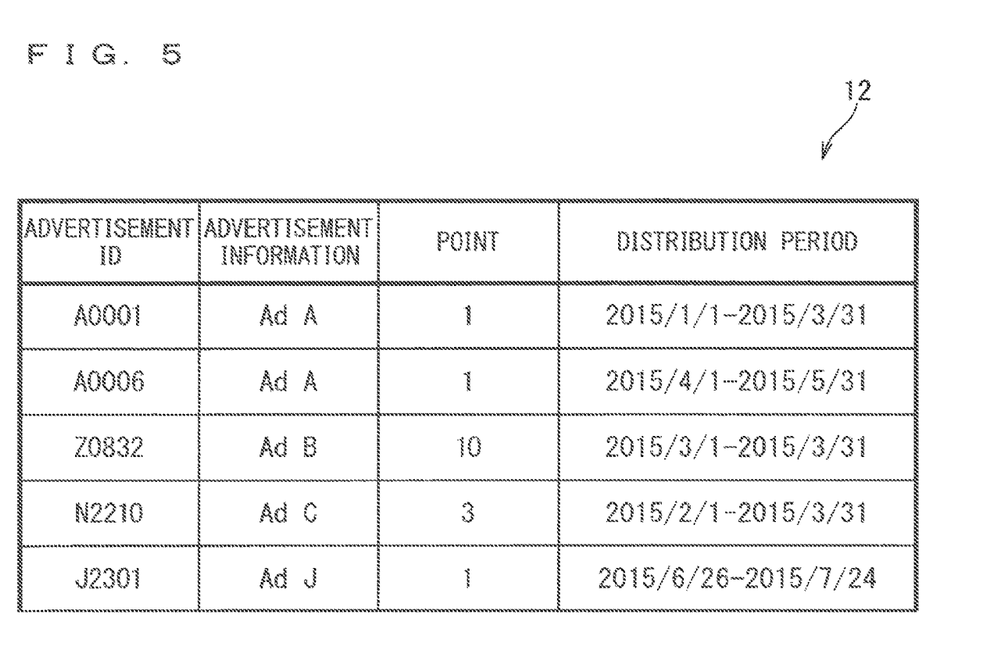
[FIG. 5] A drawing illustrating an example of an advertisement management database.

The advertisement information which is to be distributed is previously made by an advertiser. The member and advertisement management server 10 holds the advertisement management database 12 for managing the advertisement information. FIG. 5 is a drawing illustrating an example of the advertisement management database 12. An advertisement ID is individually allocated to each piece of distributable advertisement information, and is registered in the advertisement management database 12. That is to say, the advertisement ID is an identification code uniquely allocated to each piece of registered advertisement information. A total number of given points and a distribution period of the advertisement, for example, are also registered in the advertisement management database 12. A different advertisement ID is allocated to the advertisement information which has the same contents but has a different distribution period. For example, as is registered in a first line and a second line of the advertisement management database 12 in FIG. 5, an advertisement ID "A0001" is allocated to the advertisement information which has the same contents but has an earlier distribution period, and an advertisement ID "A0006" is allocated to the advertisement information which has the later distribution period. Contents of the advertisement information themselves (a video to advertise goods, for example) are stored in an appropriate site (a site of the advertiser, for example).

A transmission of the advertisement information is started when the member A firstly transmits one piece of advertisement information registered in the advertisement management database 12 via the interact 1 (Step S1). The member A transmits the advertisement information using SNS such as Facebook (registered trademark) or LINE (registered trademark) or e-mail. In the present embodiment, the member A transmits advertisement information "Ad A" which has the earlier distribution period (referred to as "the prior Ad A" hereinafter). The member A is not a specific member but is an optional member which has been registered.

When the member transmits the advertisement information, the advertisement publication server 30 generates a hash code (Step S2). That is to say, the advertisement publication server 30 functions as a hash code generation server. The hash code indicates a code with fixed length obtained by a predetermined arithmetic processing from original data. The advertisement publication server 30 generates the hash code from the ID of the member who is a source of the advertisement information and the ID of the advertisement information which is to be transmitted. In the example described above, the advertisement publication server 30 performs the predetermined arithmetic processing on a combination of "P0001" which is the member ID of the member A who is the source and "A0001" which is the advertisement ID of the advertisement information "prior Ad A" which is to be transmitted, thereby generating a hash code "a5XOan7b". A specific algorithm of the arithmetic processing may be appropriately performed by connecting a character string and replacing a character one by one or switching an order of the characters, for example. However, since the hash code generation of the present embodiment is the arithmetic processing of uniquely obtaining the hash code from the original data, the member ID of the member who is the source and the advertisement ID of the advertisement information which is to be transmitted, which are the original data, can be obtained from the hash code by a reverse conversion.

Subsequently, the advertisement publication server 30 gives the generated hash code to an address of the contents of the advertisement information which is to be transmitted on the internet 1, that is to say, a uniform resource locator (URL) of the contents of the advertisement information. Then, the advertisement publication server 30 describes the URL of the contents of the advertisement information to which the hash code is given in the advertisement information transmitted by the member.

Figure 6:
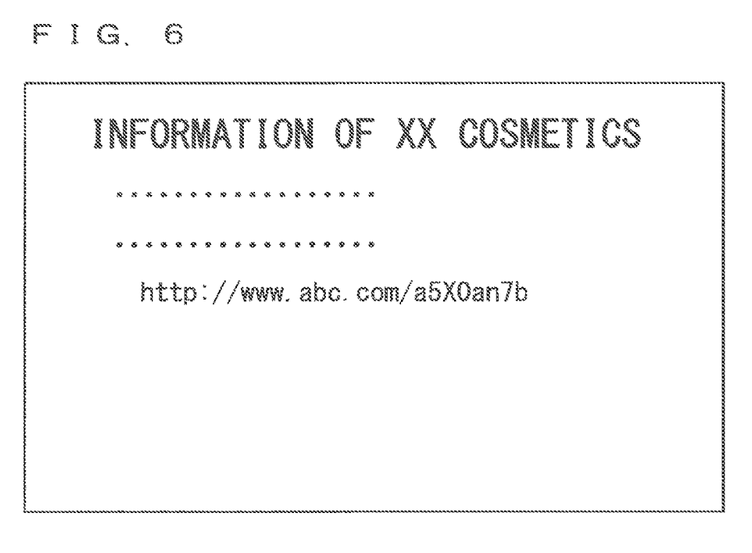
[FIG. 6] A drawing illustrating an example of advertisement information transmitted by a member.

FIG. 6 is a drawing illustrating an example of advertisement information transmitted by the member A. As illustrated in FIG. 6, the URL of the contents of the advertisement information "prior Ad A" in which the hash code "a5XOan7b", which has been generated as described above, is given to an end thereof is described in the advertisement information "prior Ad A" which the member A transmits using SNS or e-mail, for example.

The information which the member A transmits using SNS or a mailing list of e-mail is generally browsed by a plurality of friends or acquaintances of the member A. Thus, when the member A transmits the advertisement information using SNS, for example, a great advertising effect can be expected as a high-quality advertisement compared to a case of simply attaching the banner advertisement on the webpage.

Assumed next is that the member B which browses and takes an interest in the advertisement information transmitted by the member A accesses the contents of the advertisement information using the with the hash code described in the advertisement information (Step S3). At this time, the access management server 20 specifies the member A who is the source and the advertisement information "prior Ad A", which has been transmitted, from the hash code assigned to the end of the URL which the member B has used for access (Step S4). Specifically, the access management server 20 performs the reverse conversion of the arithmetic processing described above on the hash code "a5XOan7b" and specifies "P0001" which is the member ID of the member A who is the source and "A0001" which is the advertisement ID of the advertisement information "prior Ad A" which is to be transmitted, thereby specifying the member A who is the source and the advertisement information "prior Ad A" which has been transmitted.

Figure 7:
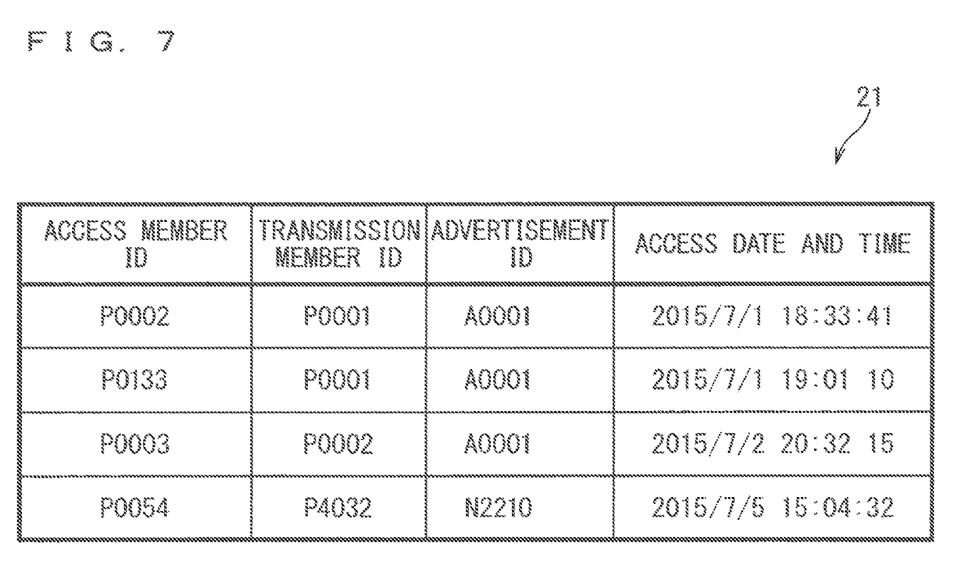
[FIG. 7] A drawing illustrating an example of an access management database.

The access management server 20 associates the member ID of the member B who has the access and the member ID of the member A who is the source specified as described above with an access time and registers them in the access management database 21. FIG. 7 is a drawing illustrating an example of the access management database 21. The member ID "P0002" of the member B who has the access and the member ID "P0001" of the member A who is the source are associated with "A0001" which is the advertisement ID of the advertisement information and the access time, and are registered.

Subsequently, the point management server 40 gives a prescribed point to the member A who is the source and the member B which has the access (Step S5). The given point is calculated based on the point registered in the advertisement management database 12 (FIG. 5), and may be different between the member A who is the source and the member B who has the access.

Next, there may be a case where the member B satisfied with the contents of the advertisement information hopes to further smit the advertisement information to his/her acquaintances. That is to say, the member B diffuses the advertisement information transmitted from the member A via the internet 1 (Step S6). The member B also transmits the advertisement information "prior Ad A" using SNS or e-mail, for example.

Also when the member B transmits the advertisement information "prior Ad A", the advertisement publication server 30 generates a hash code (Step S7). At this time, the advertisement publication server 30 performs the predetermined arithmetic processing on a combination of "P0002" which is the member ID of the member B who is a new source of the advertisement information and "A0001" which is the advertisement ID of the advertisement information "prior Ad A" which is to be transmitted, thereby generating a hash code "zb8Th6ds". Subsequently, in the manner similar to the processing described above, the advertisement publication server 30 gives the generated hash code to the content URL of the advertisement information which is to be transmitted. Then, the advertisement publication server 30 describes the URL of the contents of the advertisement information to which the hash code is given in the advertisement information transmitted by the member B.

Figure 8:
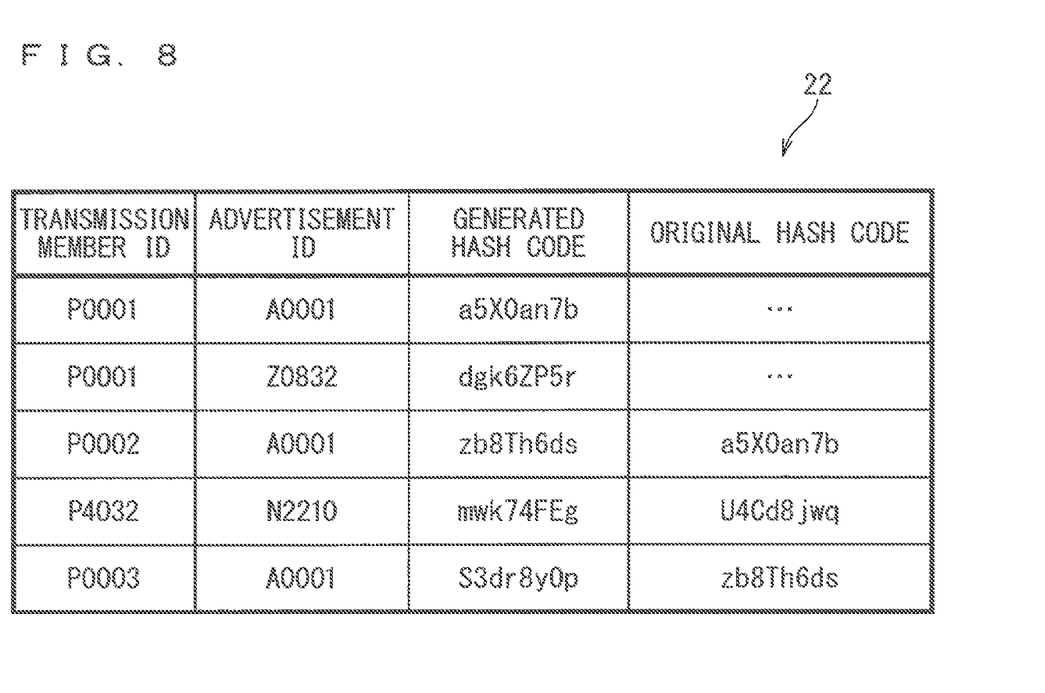
[FIG. 8] A drawing illustrating an example of a hash code history database.

When the advertisement publication server 30 generates the hash code, the access management server 20 registers the generated hash code in the hash code history database 22. FIG. 8 is a drawing illustrating an example of the hash code history database 22. When the member B transmits the advertisement information "prior Ad A", the advertisement publication server 30 generates the hash code "zb8Th6ds" from the member ID "P0002" of the member B and the advertisement ID "A0001" of the advertisement information "prior Ad A". The access management server 20 registers the hash code "zb8Th6ds" generated from the member ID "P0002" and the advertisement ID "A0001" in the hash code history database 22 (refer to a third line of the hash code history database 22 in FIG. 8).

Together with the processing described above, as illustrated in FIG. 8, the access management server 20 associates the hash code preceding the newly generated hash code, that is to say, the hash code "a5XOan7b" generated from the member ID "P0001" of the member A who has transmitted the advertisement information to the member B who is the new source and the advertisement ID "A0001" of the advertisement information "prior Ad A" with the newly generated hash code "zb8Th6ds", and registers it in the hash code history database 22 (Step S8).

Since the access management server 20 registers the generated hash code in the hash code history database 22 every time the advertisement publication server 30 generates the hash code, also when the member A transmits the advertisement information and the advertisement publication server 30 generates the hash code "a5XOan7b" in Step S2, the access management server 20 registers the hash code in the hash code history database 22 (refer to a first line of the hash code history database 22 in FIG. 8). However, the member A is the original source of the transmission of the advertisement information "prior Ad A", and there is no hash code which is generated before the member A transmits the advertisement information, thus there is no original hash code registered in the hash code history database 22 in association with the hash code "a5XOan7b".

Assumed next is that the member C which browses and takes an interest in the advertisement information transmitted by the member B accesses the contents of the advertisement information using the URL with the hash code described in the advertisement information (Step S9). At this time, the access management server 20 specifies the member B who is the source and the advertisement information "prior Ad A", which has been to be transmitted, from the hash code assigned to the end of the URL which the member C has used for access (Step S10). Specifically, the access management server 20 performs the reverse conversion of the arithmetic processing described above on the hash code "zb8Th6ds" and specifies "P0002" which is the member ID of the member B who is the source and "A0001." which is the advertisement ID of the advertisement information "prior Ad A" which is to be transmitted, thereby specifying the member B who is the source and the advertisement information "prior Ad A" which has been transmitted.

Furthermore, the access management server 20 specifies the member A which is the previous source from the original hash code associated with the hash code, which is assigned to the end of the URL which the member C has used for access, in the hash code history database 22 (Step S11). Specifically, the access management server 20 obtains the original hash code "a5XOan7b" associated with the hash code "zb8Th6ds" from the hash code history database 22, performs the reverse conversion of the arithmetic processing described above on the hash code "a5XO7b", and specifies "P0001" which is the member ID of the member A who is the source and "A0001" which is the advertisement ID of the advertisement information "prior Ad A" which is to be transmitted, thereby specifying the member A who is the previous source.

The access management server 20 associates a member ID "P0003" of the member C who has the access and the member ID "P0002" of the member B who is the source specified as described above with an access time and registers them in the access management database 21 (refer to a third line of the access management database 21 in FIG. 7). Subsequently, the point management server 40 gives a prescribed point to member C who has the access, the member B who is the source, and the member A who is the previous source (Step S12).

Afterward, when the member C further diffuses the advertisement information via the internet 1, the processing similar to that from Step S6 to Step S12 is executed repeatedly. At this time, the previous hash code is associated with the newly generated hash code, and then, the newly generated hash code and the previous hash code are registered in the hash code history database 22. Then, when the other member accesses the contents of the advertisement information transmitted by the member C, the member ID of the member C is specified from the hash code assigned to the end of the URL which the other member has used for access and then, the member ID of the member B, who is the previous source, from the original hash code associated with the hash code in the hash code history database 22, and furthermore, the member ID of the member A, who is the original source, from the original hash code associated with the original hash code in the hash code history database 22. That is to say, when the member accesses the contents of the advertisement information, not only the hash code which the member has used for access but also the previous hash code are sequentially decompressed by the reverse conversion with reference to the hash code history database 22, thus the history of transmitting the advertisement information on the internet 1 can be traced and grasped. The history may be traced until there is no more previous hash code (for example, there is no more previous hash code once the hash code "a5XOan7b" is obtained) or until a total number of the transmissions reaches a preset predetermined number of the transmissions. Then, the point management server 40 gives the predetermined point to all of the members grasped in tracing the history. The member can send a request of exchanging the accumulated point for predetermined goods to the point management server 40.

In the present embodiment, when one member takes an interest in and diffuses advertisement information transmitted from the other member, a converted previous hash code b which includes an ID of the other member is associated with a converted hash code a which includes an ID of the one member, and then, the hash code a and the previous hash code b are registered in the hash code history database 22. When the still other member browses advertisement information transmitted from the one member and accesses contents of the advertisement information, the one member who is a source is specified from the hash code a, and the other member who is a previous source is specified from the hash code b associated with the hash code a in the hash code history database 22. The history of transmitting the information on the network can be traced and grasped by repeating the processing described above. Accordingly, the point can be given to the plurality of persons which have mediated the transmission of the advertisement information, for example.

When each member accesses the contents of the advertisement information, each member posts a comment (accompanying information) on the contents of the advertisement information in some cases. Such a comment is typically displayed in an order from the latest posting, however, it is also applicable to display the comment of the person, who has mediated the transmission of the advertisement information to the member who has the access, high in the posted comments based on the information transmission history grasped by the method described above. In the example described above, when the member C accesses the contents of the advertisement information, the comments on the contents posted by the member A and the member B may be displayed in priority to the other comments. According to the above configuration, the member who accesses the contents of the advertisement information can preferentially read the comment of the acquaintance whom the member directly or indirectly knows.

The embodiments of the present invention has been described above, however, various modifications can be made to the present invention without departing from the spirit of the invention other than the embodiments described above. For example, in the embodiments described above, the previous original hash code is associated with the hash code generated in the hash code history database 22. Since identicalness of the advertisement information is maintained, the member ID of the member who is the previous source may be directly associated with the generated hash code. Specifically, the member ID "P0001" of the member A who is the previous source may be directly associated with the hash code "zb8Th6ds" generated in the third line of the hash code history database 22 in FIG. 8, for example. Also in such a manner, the history of transmitting the information on the network can be traced and grasped.

In the embodiment described above, the four servers (the member and advertisement management server 10, the access management server 20, the advertisement publication server 30, and the point management server 40) are provided as the whole system, however, the configuration is not limited thereto, but some of these servers may be achieved by one computer system.

In the embodiments described above, the advertisement information is the subject to be transmitted, however, the configuration is not limited thereto, but the information other than the advertisement may also be transmitted.

EXPLANATION OF REFERENCE SIGNS 1 internet
10 member and advertisement management server
20 access management server
30 advertisement publication server
40 point management server
11 member information management database
12 advertisement management database
21 access management database
22 hash code history database

The invention claimed is:

1. A history management method of managing a history of diffusing information on a network, comprising following steps of:
 (a) making an advertisement publication server generate a first hash code by performing an arithmetic processing on a combination of an identification code of a first member and an identification code of advertising information when the first member transmits the advertising information via a network, and give the first hash code to an address of the advertising information on the network to describe the address and the first hash code in the advertising information;
 (b) making an access management server register the first hash code in a hash code history database stored in the access management server;
 (c) making the access management server, when a second member accesses the advertising information in response to the transmission from the first member, specify the identification code of the first member and the identification code of the advertising information by performing the reverse conversion of the arithmetic processing on the first hash code;
 (d) making the advertisement publication server generate a second hash code by performing the arithmetic processing on a combination of an identification code of the second member and the identification code of the advertising information when the second member further transmits the advertising information received from the first member via the network, give the second hash code to the address of the advertising information on the network to describe the address and the second hash code in the advertising information;
 (e) making the access management server associate the first hash code with the second hash code to register the first hash code and the second hash code in a hash code history database stored in the access management server; and
 (f) making the access management server, when a third member accesses the advertising information in response to the transmission from the second member, specify the identification code of the second member and the identification code of the advertising information by performing the reverse conversion of the arithmetic processing on the second hash code, obtain the first hash code associated with the second hash code from the hash code history database stored in the access management server, and specify the identification code of the first member by performing the reverse conversion of the arithmetic processing on the first hash code.

2. The history management method according to claim 1, wherein in the step (c), a point management server gives a point to the second member who has accessed the advertising information and the first member specified from the first hash code, and in the step (f), the point management server gives a point to the third member who has accessed the advertising information, the second member specified from the second hash code, and the first member specified from the first hash code.

3. The history management method according to claim 1, wherein when the third member accesses the advertising information, accompanying information transmitted by the first member and the second member in accompanying information transmitted in association with the advertising information is displayed in priority to another accompanying information.

* * * * *